US012282876B2

(12) United States Patent
Bjelcevic et al.

(10) Patent No.: US 12,282,876 B2
(45) Date of Patent: Apr. 22, 2025

(54) INTELLIGENT ORDER PICKUP PROCESSING

(71) Applicant: NCR Voyix Corporation, Atlanta, GA (US)

(72) Inventors: Stefan Bjelcevic, Roswell, GA (US); Jodessiah Sumpter, Alpharetta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/160,963

(22) Filed: Jan. 28, 2021

(65) Prior Publication Data

US 2022/0237543 A1    Jul. 28, 2022

(51) Int. Cl.
| | | |
|---|---|---|
| G06Q 10/087 | (2023.01) | |
| G06Q 10/0631 | (2023.01) | |
| G06Q 10/08 | (2024.01) | |
| G06Q 30/0601 | (2023.01) | |
| H04W 4/021 | (2018.01) | |
| H04W 4/029 | (2018.01) | |
| G06V 20/62 | (2022.01) | |

(52) U.S. Cl.
CPC .  *G06Q 10/06315* (2013.01); *G06Q 10/06311* (2013.01); *G06Q 10/08* (2013.01); *G06Q 10/087* (2013.01); *G06Q 30/0639* (2013.01); *H04W 4/021* (2013.01); *H04W 4/029* (2018.02); *G06V 20/62* (2022.01)

(58) Field of Classification Search
CPC ............... G06Q 10/087; G06Q 50/30; G06Q 10/06311; G06Q 10/0833; G06Q 10/0832
See application file for complete search history.

(56) References Cited

U.S. PATENT DOCUMENTS

| | | | | |
|---|---|---|---|---|
| 9,633,389 | B2 * | 4/2017 | Carr | G06Q 10/0836 |
| 10,445,816 | B2 * | 10/2019 | Carr | G06Q 30/0635 |
| 10,482,421 | B1 * | 11/2019 | Ducrou | G06V 20/54 |
| 10,592,847 | B2 * | 3/2020 | Scholey | G06Q 10/0836 |
| 11,188,970 | B1 * | 11/2021 | Xu | G06Q 10/0834 |
| 11,244,529 | B2 * | 2/2022 | Zhang | G06Q 10/04 |
| 2014/0279269 | A1 * | 9/2014 | Brantley | G06Q 30/0635 |
| | | | | 705/26.81 |
| 2015/0348146 | A1 * | 12/2015 | Shanmugam | G06Q 30/0603 |
| | | | | 705/27.2 |

(Continued)

FOREIGN PATENT DOCUMENTS

CA        3155814 A1 *  5/2021 .......... G06Q 10/087

Primary Examiner — Johnna R Loftis

(74) Attorney, Agent, or Firm — Schwegman Lundberg & Woessner, P.A.

(57) ABSTRACT

Locations of a customer's device are tracked relative to an order placed with an establishment. The establishment is instructed to begin order preparation to coincide with the customer's arrival for the order. Customer's arrival at a pickup location is detected within a geofenced area for a premises of the establishment's location. Sensor data provided for the geofenced area is processed to track a vehicle of the customer within the geofenced area and to identify a specific location within the geofenced area where the vehicle is parked. Delivery staff are notified that the customer has arrived for the order and directed to the specific location where the vehicle is parked.

16 Claims, 3 Drawing Sheets

(56) References Cited

U.S. PATENT DOCUMENTS

| | | | |
|---|---|---|---|
| 2016/0019526 A1* | 1/2016 | Granbery | G01S 1/00 |
| | | | 705/26.81 |
| 2016/0125514 A1* | 5/2016 | Plattenburg | H04W 4/029 |
| | | | 705/26.9 |
| 2017/0124670 A1* | 5/2017 | Becker | G06Q 30/0635 |
| 2017/0337523 A1* | 11/2017 | Roach | G06Q 10/1097 |
| 2018/0014154 A1* | 1/2018 | Shaffer | H04W 4/40 |
| 2018/0082361 A1* | 3/2018 | Wilkinson | G06Q 30/0639 |
| 2019/0294889 A1* | 9/2019 | Sriram | G06F 18/24143 |
| 2020/0193374 A1* | 6/2020 | Nagarathinam | H04W 4/35 |
| 2021/0125445 A1* | 4/2021 | Zhang | G07C 11/00 |
| 2021/0133665 A1* | 5/2021 | Hsiao | G06Q 10/103 |
| 2021/0352433 A1* | 11/2021 | Tu | H04W 4/029 |
| 2021/0364651 A1* | 11/2021 | Helms | H04W 4/021 |
| 2022/0189305 A1* | 6/2022 | Heikal | H04N 5/272 |

* cited by examiner

INTELLIGENT ORDER PICKUP PROCESSING

BACKGROUND

Despite its heavy adoption among both business and customers, curbside pickup still faces challenges. The average waft time is nearly 5 and a half minutes, which is slower than drive-thru or in-store pickup options. If orders are prepared too far in advance, they run the risk of diminishing food quality.

The longer cars idle waiting for their orders, the more likely they are to fill all curbside pickup spots and cause greater delays. Customers must enter their curbside pickup spot number before they can receive their order, which is an added point of friction. Furthermore, few customers actually follow instructions or abide by store parking lot signage, such that customers often park in a wrong pickup spot number when arriving at the store, which causes confusion for the store delivery staff. Customers with an under two-minute wait for their orders were four times more likely to return to the well-performing brand regularly.

Currently, only 7% of orders are ready in less than two minutes. Curbside pickup has exploded in popularity due to COVID-19, and many places that previously didn't offer any sort of take-out or online ordering are being forced to adapt to survive.

SUMMARY

In various embodiments, methods and a system for intelligent order pickup processing are presented.

According to an embodiment, a method for intelligent order pickup processing is provided. Specifically, and in one embodiment, an order placed with an establishment by a customer is detected Locations of a device operated by the customer are tracked based on the order. A vehicle driven by the customer within a geofenced area of an establishment's location is identified. A specific location within the geofenced area where the vehicle is parked is determined and a notification is sent to an establishment device operated by delivery staff of the establishment that provides the specific location for an order number for the order.

DETAILED DESCRIPTION

Figure 1:
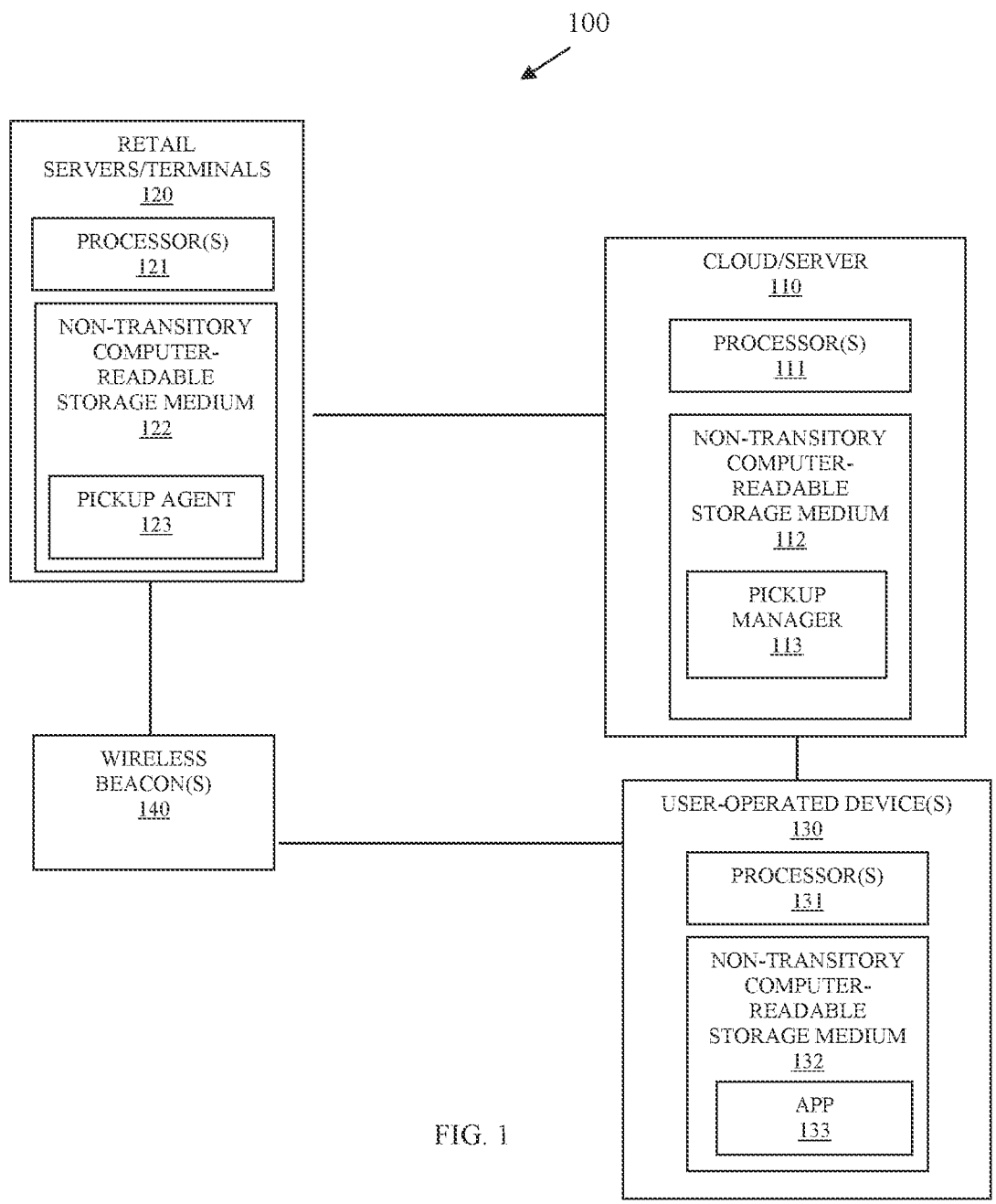
FIG. 1 is a diagram of a system for intelligent order pickup processing, according to an example embodiment.

FIG. 1 is a diagram of a system 100 for intelligent order pickup processing, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the intelligent order pickup processing presented herein and below.

Moreover, various components are implemented as one or more software modules, which reside in non-transitory storage and/or hardware memory as executable instructions that when executed by one or more hardware processors perform the processing discussed herein and below.

The techniques, methods, and systems presented herein and below for intelligent order pickup processing can be implemented in all, or some combination of the components shown within one or more hardware computing devices having one or more hardware processors.

System 100 provides a comprehensive management of a customer's curbside pickup. A customer places an order with a retailer/establishment. The customer is asked via an interface (mobile application (app)-based or browser-based) to provide a description of their vehicle, a license plate number, or to opt-out of providing any detailed car information. An estimated time to prepare the order is calculated along with a travel time for the customer at their current location to reach the establishment. The customer's current location is continuously monitored and when a calculated travel time of the customer to the establishment is approximately equal an estimated time to prepare the order, the establishment is instructed to being preparing the order. This ensures that the order is fresh and/or hot when the customer arrives. A geofence is defined around the establishment and monitored based on the current location of the customer. When the customer is within the geofence, computer vision is processed on images of the customer's vehicle to identify the customer's position within the geofence and location at the establishment. The customer may park anywhere in the lot or may receive a push notification to park in a designated parking spot number. The establishment is alerted that the customer has arrived and is provided the location that the vehicle of the customer is parked in within the geofenced area. When the customer opted out of providing any identifying vehicle information, a push notification is sent to the customer asking the customer to provide the parking spot number where he/she has parked, and this is forwarded to the establishment. In an opt out situation, wireless beacons may also be used to uniquely identify the customer's parking spot number. System 100 may also monitor customer's vehicle and alert the establishment when the customer's vehicle has changed location from an originally identified or reported location. Staff of the establishment can focus on order preparation with assurances that delivery staff is dispatched when the customer arrives and dispatched to an exact location of the customer on the store's premises.

The system 100 includes; a cloud/server 110, retail servers/terminals 120, a plurality of user-operated devices 130, and, optionally, wireless beacons 140.

Cloud/server 110 comprises one or more hardware processors 111 and a non-transitory computer-readable storage medium 112. Medium 112 comprises executable instructions for a pickup manager 113. When the executable instructions are provided to processor 111, this causes processor 111 to perform operations discussed herein and below for pickup manager 113.

Each retail server/terminal 120 comprises one or more processors 121 and a non-transitory computer-readable storage medium 122. Medium 122 comprises executable instructions for a plurality of pickup agents associated with the corresponding server/terminal 120. When the executable instructions are provided to processor 121, this causes processor 121 to perform operations discussed herein and below for pickup agents 123.

Each user-operated device 130 comprises one or more processors 131 and a non-transitory computer readable storage medium 132. Medium 132 comprises executable instructions for a mobile application (app) 133. When the executable instructions are provided to processor 131, this causes processor 131 to perform operations discussed herein and below for apps 133.

Optionally, system 100 comprises wireless beacons 140 that emit wireless signals comprising a beacon identifier. The beacon identifier uniquely identifies the beacon 140 is detected by Wi-Fi and/or Bluetooth® Low Energy (BLE) by app 140. App 140 may also determine a signal strength for the signal that comprises the beacon identifier. App 140 forwards the beacon identifier and signal strength to pickup manager 113, permitting pickup manager to match the beacon identifier with a particular beacon 140 having a known position/location on a premises of a retailer and process the signal strength to infer an exact location of a user-operated device 130 for the customer relative to the known beacon's location.

In an embodiment, app 133 is an enhanced version of a retailer's existing customer app or an enhanced version of an third-party ordering service's existing app comprising the features discussed herein and below, such that a customer having retailer's/third-party's existing customer app can process an updated and enhanced version of app 133 to perform the processing discussed herein and below.

During operation of system 100, a customer places an order with a retailer. This can be done via phone, via an existing version of retailer's/third party's app, of via an enhanced version of retailer's/third party's app 133 (third parties can be any third-party ordering service, such as Door Dash®, Post Mates®, Grub Hub®, etc.). The customer is presumed to have registered with either the retailer or the third-party service at the time the order was placed, such that the order is linked to a customer identifier and/or mobile device identifier. Both the retailer and any third-party service provides Application Programming Interfaces (APIs) for interaction with pickup manager 113.

In cases of ordering by phone or an existing version of retailer's/third party's app, backend systems of the retailer or the third party push a notification to customer's device 130 asking the customer to install app 133 or simply click a link to install app 133. The customer may then separately register his/her device 130 with cloud/server 110 and linked it to the retailer and/or third-party account of the customer.

One an order is placed with a registered customer a notification is provided to pickup manager 113 via an API call from backend systems of the retailer or the third-party service. The notification comprises one or more of; retailer identifier for the retailer where the order was placed, a store identifier unique to a store of that retailer, a time and date stamp, an order identifier for the order placed, a customer identifier for the customer, and a mobile device identifier for the user-operated device 130 of the customer that placed the order.

At this point, pickup manager 113 is equipped with enough information to track the order; interact with the retailer's backend system via API calls, and interact with the customer via app 133 (directly through customer responses and automatically through location reporting of app 133).

Pickup manager 133 sends an instruction to app 133 to begin reporting the customer's location based on location services (e.g.; Global Positioning Satellite, Wi-Fi, cellular, etc.) and asks retailer's backend systems to report a status on pending orders that a queued for preparation and the customers order preparation status. Pickup manager 113 may also determine that the customer is remaining in a fixed location without movement, which may indicate that the customer is at home, is stationary at a fixed location, is stuck in traffic, or not otherwise traveling. In these situations, Pickup manager 113 sends a push notification to app 133 asking whether the customer is stuck in traffic and asking for an expected time that the customer will arrive at the store location where the order is to be picked up by the customer. Pickup manager 113 may similarly determine that the customer is traveling and on a route towards the store location. Traffic conditions and navigation services are used along with the customer's current location and reported locations within predefined intervals to determine when (an approximate time of day) the customer will arrive at the store.

When the customer places the order through any of the above-mentioned techniques, manager 113 obtains the order information from the retailer or third-party service and triggers a notification to app 133 to display a user-facing interface screen providing three options to the customer: 1) provide car description option, 2) provide car license plate number option, and 3) opt out providing no description information for the customer car (vehicle). Options 1 and 2 will trigger additional user-facing interface screens for customer entry of the corresponding information needed. App 133 provides input vehicle information to manager 113.

Pickup manager 113 uses APIs to retailer's store order preparation system to optimally select when the store and staff should begin to prepare the customer's order. This can be calculated based on metrics for the store associated with order preparation times, the customer-reported time of arrival, and/or the calculated time of arrival. An optimal time of day that the store should begin order preparation is calculated and at that time, manager 113 sends a push notification to staff devices that prepare the order at the store to begin order preparation. This is calculated as an optimal time that coincides with the customer's time of arrival on the premises of the store for order pickup, such that order is fresh and/or hot when the customer picks up the order.

One manager 113 instructs staff at the store to begin order preparation, a geofence is defined for the parking lot area or pickup area of the store. This is used in combination with the reported current locations of device 130 from app 133 to determine when the customer has arrived at the store to pickup the order.

In an embodiment, the geographic parameters of the geofence is sent my manager 113 to app 133. In this embodiment, app 133 monitors to determine when the customer has entered the geofenced area and the reporting of the device's location by app 133 to manager 113 can be reduced or eliminated allowing app 133 to monitor for entry into the geofenced area.

Once the customer is detected to be within the geofenced area (either by manager 113 or through reporting of the entry by app 133 to manager 133), pickup agent 123 and/or manager 113 begin to monitor the vehicle of the customer through reported sensor information by sensors and/or beacons 140. For example, cameras situated in the parking lot of the store stream images of the vehicles and computer vision applications (processing on server/terminal 120 and/or cloud/server 110) use the vehicle information reported by the customer when the order was placed to create bounding boxes around each vehicle, extract vehicle features (size, shape, color, license plate, etc.), and track the location of the vehicle within the parking lot of the store based on known locations in the parking lot that each camera captures in the images with their field-of-views. This can pinpoint the vehicle's location to a specific parking space or parking space number on the store's premises.

Additionally, once detected within the geofence, manager 113 sends a welcome message to app 133 for displaying to the customer and sends a push notification to pickup agent 123 (when manager 113 did not use pickup agent 123 to perform the geofencing location processing).

When the customer, opted out of providing any vehicle information during the order, the welcome notification displayed with the welcome message by app 133 also includes a field for the customer to supply the exact parking spot of their vehicle in an input field. Once the location is provided, manager 113 reports the location to agent 123.

Once agent 123 has the location of the vehicle for the customer, agent 123 sends a push notification to devices operated by delivery staff at the store. The push notification comprises the order number and the vehicle's location on the store premises. The notification may also option provided the vehicle's description when it was provided or license plate when it was provided.

Staff of the store are optimally configured and utilized by system 100, since preparation staff only begins to prepare the order at a time that coincides with the customer's estimated arrival at the store and since delivery staff are dispatched to the exact location on the premises where the customer's order is to be delivered to the customer. As a result, system 100 permits stores to remain competitive and retrain customer loyalty by providing timely and fresh orders delivered directly to the customer without any guesswork and without any confusion.

In an embodiment, computer vision applications may continue to monitor the customers vehicle on the premises after the customer initially pulls into a specific parking space. Should the customer move their vehicle before the order is delivered to a different space, manager 113 and/or agent 123 receives an alert, which is then directly dispatched to a device operated by the delivery person. This is beneficial because customers often do move their vehicles when the believe a better situated space opened up.

In an embodiment for when the customer opted out of providing vehicle information, beacons 140 may be used to pinpoint the customer's vehicle location on the premises. Here, app 133 forwards beacon identifiers from beacons 140 to manager 113 and/or agent 123 and optionally, along with a signal strength for the signal detected by device 130. Agent 123 and/or manager 113 may calculate a direction and an offset of the vehicle relative to the corresponding beacons and their signals, and further calculate that the customer is in a particular vehicle from the images captured by the cameras and located in a particular parking spot, which can then be forwarded to the device associated with the delivery person. In this way, even when a customer opts out, the customers vehicle can be pinpointed to a particular parking spot on the premises.

Figure 2:
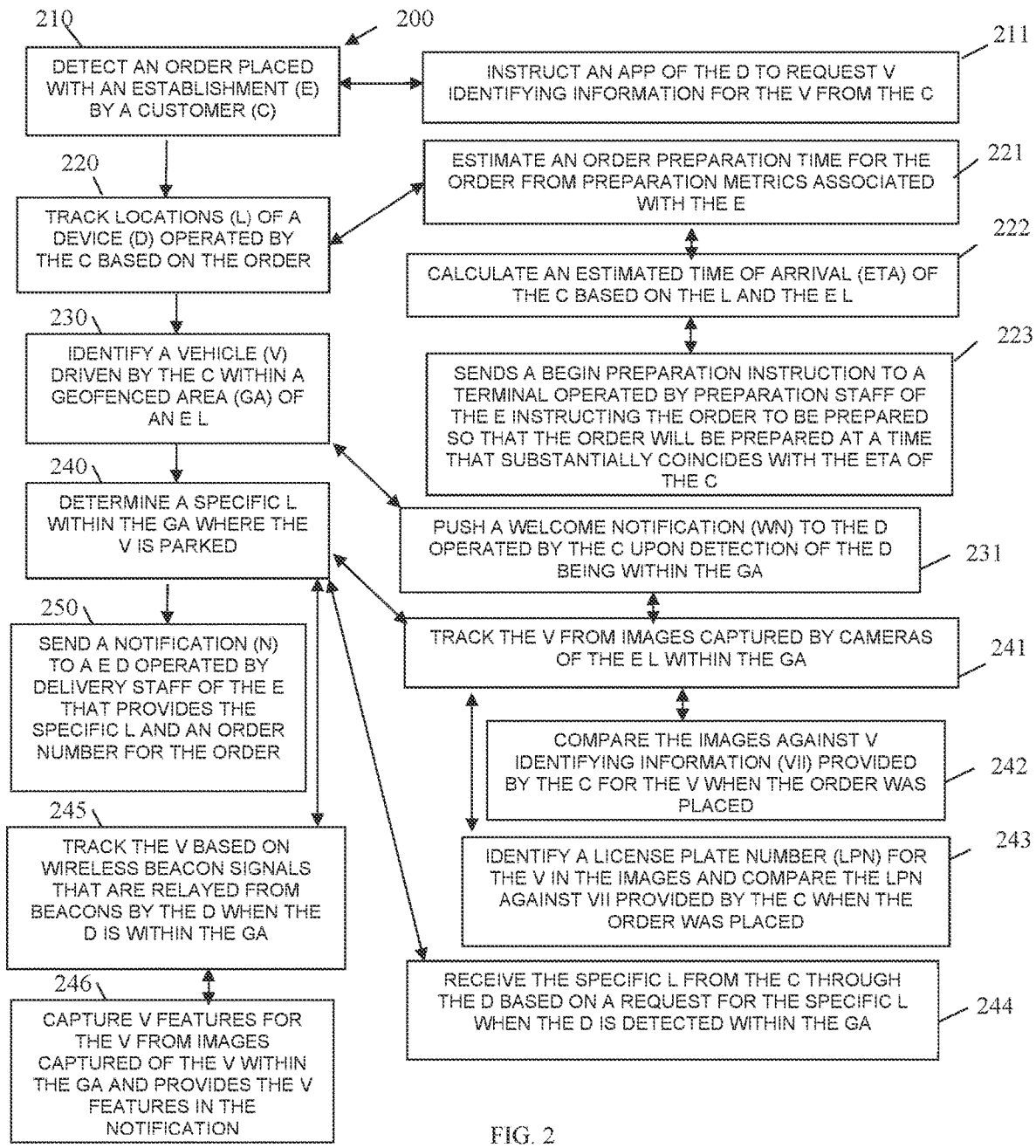
FIG. 2 is a diagram of a method for intelligent order pickup processing, according to an example embodiment.
Figure 3:
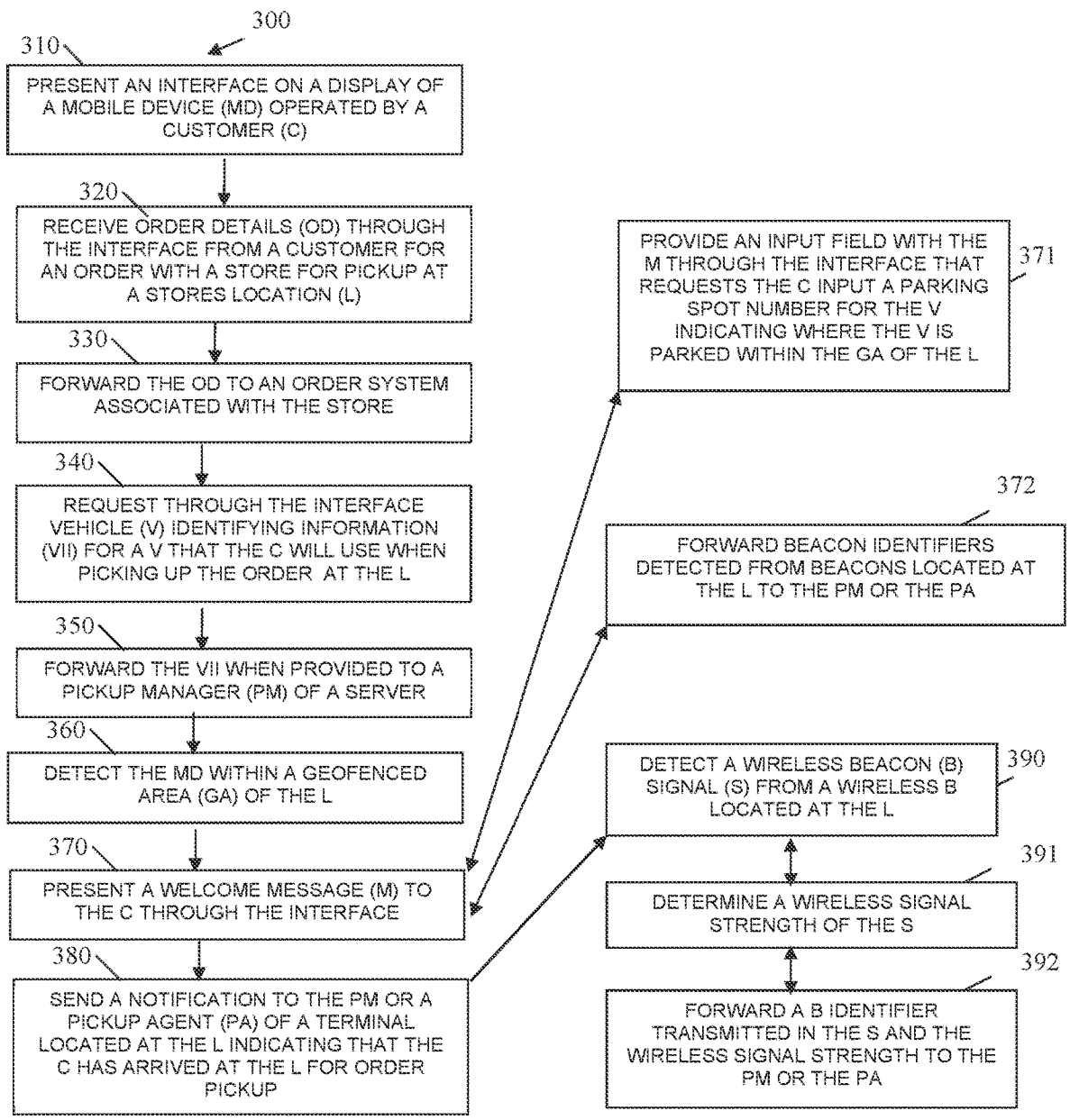
FIG. 3 is a diagram of another method for intelligent order pickup processing, according to an example embodiment.

The embodiments of FIG. 1 and other embodiments are now discussed with reference to the FIGS. 2-3, FIG. 2 is a diagram of a method 200 for intelligent order pickup processing, according to an example embodiment. The software module(s) that implements the method 200 is referred to as a "pickup manager." The pickup manager is implemented as executable instructions programmed and residing within memory and/or a non-transitory computer-readable (processor-readable) storage medium and executed by one or more hardware processors of one or more hardware computing devices. The processors of the devices that execute the pickup manager are specifically configured and programmed to process the pickup manager. The pickup manager has access to one or more networks during its processing. The networks can be wired, wireless, or a combination of wired and wireless.

In an embodiment, the device that executes the pickup manager is a cloud/server 110. In an embodiment the device that executes the pickup manager is a server 110. In an embodiment, a plurality of servers cooperate to execute the pickup manager from one logical cloud server 110.

In an embodiment, the pickup manager is pickup manager 113 discussed above with system 100.

At 210, the pickup manager detects an order placed with an establishment by a customer for a curbside pickup. This can be detected in any of the manners discussed above with the FIG. 1.

In an embodiment, at 211, the pickup manager instructs app 133 to request vehicle identifying information for a vehicle that the customer will use to pickup the order at a location of the establishment.

At 220, the pickup manager tracks location of a device 130 operated by the customer based on the order (order number associated with the order).

In an embodiment, at 221, the pickup manager estimates an order preparation time for the order from preparation metrics associated with the establishment and based on order details for the order.

In an embodiment of 221 and at 222, the pickup manager calculates an estimated time of arrival (ETA) of the customer based on the device locations being tracked at 220 and an establishment location of the establishment where the order is to be picked up by the customer.

In an embodiment of 223 and at 224, the pickup manager sends a begin preparation instruction to a terminal operated by preparation staff of the enterprise that instructs them to prepare the order so that the order will be prepared at a time that substantially coincides with the ETA of the customer at the enterprise's location.

At 230, the pickup manager identifies a vehicle driven by the customer within a geofenced area of the establishment's location.

In an embodiment, at 231, the pickup manager pushes a welcome notification to the device 130 operated by the customer upon detection of device 130 within the geofenced area.

At 240, the pickup manager determines a specific location within the geofenced area where the vehicle is parked.

In an embodiment of 231 and 240, at 241, the pickup manager tracks the vehicle from images captured by cameras of the enterprise's location within the geofenced area.

In an embodiment of 241 and at 242, the pickup manager compares the images against vehicle identifying information (make, model, color) provided by the customer for the vehicle when the order was placed.

In an embodiment of 241 and at 243, the pickup manager identifies a license plate number for the vehicle in the images and compares against vehicle identifying information (license plate number) provided by the customer when the order was placed.

In an embodiment of 240, at 244, the pickup manager receives the specific location from the customer through device 130 based on a request made for the specific location when device 130 is detected within the geofenced area from the reported device locations at 230.

In an embodiment of 240, at 245, the pickup manager tracks the vehicle based on wireless beacon signals that are relayed from beacons by device 130 when device 130 is within the geofenced area.

In an embodiment of 245 and at 246, the pickup manager captures vehicle features from images captured of the vehicle within the geofenced area and provides the vehicle features in a notification (see 250).

At 250, the pickup manager sends a notification to an establishment device operated by delivery staff of the establishment. The notification minimally includes the specific location of where the vehicle is parked within the geofenced area and an order number for the order.

FIG. 3 is a diagram of another method 300 for intelligent order pickup processing, according to an example embodiment. The software module(s) that implements the method 300 is referred to as a "mobile device pickup agent." The mobile device pickup agent is implemented as executable instructions programmed and residing within memory and/or a non-transitory computer-readable (processor-readable) storage medium and executed by one or more hardware processors of one or more hardware devices. The processors of the devices that execute the mobile device pickup agent are specifically configured and programmed to process the mobile device pickup agent. The mobile device pickup agent has access to one or more networks during its processing. The networks can be wired, wireless, or a combination of wired and wireless.

The mobile device pickup agent interacts with the method 200.

In an embodiment, the mobile device pickup agent is mobile app 133.

In an embodiment, the device that executes the mobile device pickup agent is user-operated device 130. In an embodiment, the user-operated device is a phone, a tablet, a laptop, or a wearable processing device.

At 310, the mobile device pickup agent presents and provides an interface rendered on a display of a mobile device 130 operated by a customer.

At 320, the mobile device pickup agent receives order details through the interface from a customer for an order with a store and for pickup at the store's location (curbside pickup).

At 330, the mobile device pickup agent forwards the order details to an ordering or order system associated with the store.

At 340, the mobile device pickup agent request through the interface vehicle identifying information for a vehicle that the customer will be in and user when picking up the order at the store's location.

At 350, the mobile device pickup agent forwards the vehicle identifying information to pickup manager 113 of cloud/server 120.

At 360, the mobile device pickup agent detects the mobile device 130 within a geofenced area of the store's location.

In an embodiment, the mobile device pickup agent receives the coordinates defining the geofenced area from pickup manager 113 when the order was placed.

At 370, the mobile device pickup agent presents a welcome message to the customer through the interface, which welcomes the customer to the store, and which may include the order details for the order.

In an embodiment, at 371, the mobile device pickup agent provides an input field with the welcome message through the interface that requests the customer input a parking spot number for the vehicle or other information indicating where the vehicle is parked with the geofenced area of the store's location.

In an embodiment, at 372, the mobile device pickup agent forwards beacon identifiers from beacons located at the store's location to pickup manager 113, Note that this embodiment may be done with our without already having the vehicle information.

At 380, the mobile device pickup agent sends a notification to the pickup manager 113 and/or pickup agent 123 of terminal 120 located at the store's location and indicating in the notification that the customer has arrived at the store's location for order pickup (may included order number with notification as well).

In an embodiment, at 390, the mobile device pickup agent detects a wireless beacon signal from wireless beacons located at the store's location within the geofenced area.

In an embodiment of 390 and at 391, the mobile device pickup agent determines a wireless signal strength of the wireless beacon signal (note that this may done through an API to an Operating System (OS) of a wireless transceiver of device 130).

In an embodiment of 391 and at 392, the mobile device pickup agent forwards the beacon identifier transmitted in the wireless beacon signal and the wireless signal strength to the pickup manager 113 and/or pickup agent 123. Manager 113 and/or agent 123 may uses this information to calculate the parking spot location based on a known location of the wireless beacon within the geofenced area.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   detecting, via an Application Programming Interface (API), an order placed with an establishment by a customer;
   sending an instruction to a device operated by the customer to begin reporting a customer's location based on location services of the device and in response to the detecting;
   tracking locations of the device in response to detecting the order;
   identifying a vehicle driven by the customer within a geofenced area of an establishment's location based on reporting of the customer's location from the device and a geofence defined for a parking lot area of the establishment's location;

tracking the vehicle within the geofenced area from images captured by cameras of the establishment's location by creating bounding boxes within the images around the vehicle;

determining a specific location within the geofenced area where the vehicle is parked using the bounding boxes tracked in the images of the parking lot area, wherein the specific location is selected by the customer;

monitoring the vehicle using the bounding boxes within the images to determine when the vehicle changes from the specific location within the parking lot area to a different location;

sending a notification to an establishment device operated by delivery staff of the establishment that provides an exact location of the vehicle within the geofenced area based on either the specific location or the different location for an order number that was assigned to the order by the establishment;

capturing vehicle features for the vehicle from the images captured of the vehicle within the geofenced area and providing the vehicle features in the notification with the exact location.

2. The method of claim 1, wherein detecting further includes instructing a mobile application (app) of the device operated by the customer to request vehicle identifying information for the vehicle from the customer.

3. The method of claim 1, wherein tracking further includes estimating an order preparation time for the order from preparation metrics associated with the establishment.

4. The method of claim 3, wherein estimating further includes calculating an estimated arrival time of the customer based on the locations and the establishment's location.

5. The method of claim 4, wherein calculating further includes sending a begin preparation instruction to a terminal operated by preparation staff of the establishment instructing the order to be prepared so that the order will be prepared at a time that substantially coincides with the estimated arrival time of the customer.

6. The method of claim 1, wherein identifying further includes pushing a welcome notification to the device operated by the customer upon detection of the device being within the geofenced area.

7. The method of claim 1, wherein tracking the vehicle further includes comparing the images against vehicle identifying information provided by the customer for the vehicle when the order was placed.

8. The method of claim 1, wherein tracking the vehicle further comprises identifying a license plate number for the vehicle in the images and comparing the license plate number against vehicle identifying information provided by the customer for the vehicle when the order was placed.

9. The method of claim 1, wherein tracking further includes tracking the vehicle based on wireless beacon signals that are relayed by the device when the device is within the geofenced area.

10. The method of claim 1 further comprising, tracking further includes capturing vehicle features for the vehicle from the images captured of the vehicle within the geofenced area and providing the vehicle features in the notification with the specific location.

11. A method, comprising:

presenting an interface on a display of a mobile device operated by a customer;

receiving order details through the interface from the customer for an order with a store for pickup at a store's location;

forwarding, via an Application Programming Interface (API), the order details to an order system associated with the store;

requesting, through the interface, vehicle identifying information for a vehicle that the customer will use when picking up the order at the store's location;

forwarding the vehicle identifying information to a pickup manager of a server;

tracking locations of the mobile device using location services of the mobile device;

detecting the mobile device within a geofenced area of the store's location based on the tracking of the locations of the mobile device and a geofence defined for a parking lot area of the store's location;

presenting a welcome message to the customer through the interface based on the detecting;

tracking the vehicle within the geofenced area from images captured by cameras of the store's location by creating bounding boxes within the images around the vehicle;

sending a notification to the pickup manager or a pickup agent of terminal located at the store indicating that the customer has arrived at the store's location for order pickup and is parked in a customer-selected location within the parking lot area;

monitoring the vehicle in the customer-selected location using the bounding boxes within the images and sending a second notification to the pickup manager or the pickup agent when the vehicle moves from the customer-selected location to a different customer-selected location within the parking lot area;

providing the notification or the second notification to the pickup manager or the pickup agent as an exact location of the vehicle within the geofenced area; and estimating an order preparation time for the order from preparation metrics associated with the store.

12. The method of claim 11 further comprising, detecting a wireless beacon signal from a wireless beacon located at the store's location.

13. The method of claim 12, wherein detecting the wireless beacon signal further includes determining a wireless signal strength of the wireless beacon signal.

14. The method of claim 13, wherein determining further includes forwarding a beacon identifier transmitted in the wireless beacon signal and the wireless signal strength to the pickup manager or the pickup agent.

15. The method of claim 11, wherein presenting further includes forwarding beacon identifiers detected from beacons located at the store's location to the pickup manager or the pickup agent.

16. A system, comprising:

a server comprising at least one processor and a non-transitory computer-readable storage medium;

the non-transitory computer-readable storage medium comprising executable instructions;

the executable instructions when executed by the at least one processor cause the at least one processor to perform operations, comprising:

attempting to obtain vehicle identifying information for a vehicle of a customer linked to an order placed by the customer with a store, wherein the order is a curbside pickup order placed by the customer;

determining when the customer has entered a geofenced area of a location for the store based on mobile device locations reported by a mobile device operated by the customer using location services of the mobile device and based on tracking of the mobile device locations from the mobile device and a geofence defined for a parking lot area of the store;

notifying, via an Application Programming Interface (API), a delivery system of the store that the customer has arrived at the store;

sending a welcome message to the mobile device for presentation to the customer;

tracking the vehicle within the geofenced area from images captured by cameras of the store by creating bounding boxes within the images around the vehicle determining a parking spot within the parking lot area where the customer parks the vehicle based on the bounding boxes within the images and any vehicle identifying information provided by the customer after the welcome message was sent or provided by the customer with the attempting, wherein the parking spot is selected by the customer;

monitoring the vehicle in the parking spot and identifying when the vehicle moves to a different parking spot selected by the customer using the bounding boxes within the images;

notifying, via the API, the delivery system of an exact location associated with either the parking spot or different parking spot for delivering the order to the exact location; and capturing vehicle features for the vehicle from the images captured of the vehicle within the geofenced area and providing the vehicle features in a notification with the exact location.

\* \* \* \* \*